United States Patent [19]

Nemes

[11] 4,171,823

[45] Oct. 23, 1979

[54] DUAL-PURPOSE MOTORCYCLE LOCK BAR

[76] Inventor: Steve A. Nemes, 31497 Capri Ter., Apt. 208, Westland, Mich. 48185

[21] Appl. No.: 861,201

[22] Filed: Dec. 16, 1977

[51] Int. Cl.² .................. B60R 25/00; B62J 25/00
[52] U.S. Cl. .................. 280/289 L; 70/227; 280/291
[58] Field of Search .................. 280/289 L, 291; 180/114; 70/227, 226, 225, 233, 236

[56] References Cited

U.S. PATENT DOCUMENTS

| 518,323 | 4/1894 | Lamb et al. | 70/227 |
| 3,794,353 | 2/1974 | Oliver | 280/291 |

FOREIGN PATENT DOCUMENTS 15143  11/1906  United Kingdom ............ 70/227

Primary Examiner—Joseph F. Peters, Jr.
Assistant Examiner—Donn McGiehan
Attorney, Agent, or Firm—Harness, Dickey & Pierce

[57] ABSTRACT

A dual-purpose motorcycle lock bar that is adapted to be secured in the locking position between the spokes of the rear wheel to the swing-arm of the motorcycle, and in the transport position to the down-tubes of the motorcycle to provide a raised footrest for the rider.

1 Claim, 6 Drawing Figures

DUAL-PURPOSE MOTORCYCLE LOCK BAR

BACKGROUND AND SUMMARY OF THE INVENTION

The present invention relates to a dual-purpose motorcycle locking device and in particular to a bar lock which can also be used to provide a raised foot rest for the rider.

The various locking devices for motorcycles currently on the market are all patterned after the conventional lock and chain. Such devices are typically cumbersome and difficult to transport, and often cause damage to chrome-plated or painted surfaces of the motorcycle. Moreover, if not secured properly to the motorcycle while being transported, chains can pose a significant safety hazzard. In addition, the conventional lock and chain does not provide a particularly secure means of locking a motorcycle. This is readily evident from the current rate of motorcycle thefts in this country notwithstanding the fact that the lock and chain is utilized by almost all motorcyclists. The theft problem to a large extent has also been responsible for the dramatic increase in motorcycle insurance premiums over the past several years. The reason for the high theft rate is quite simple. A conventional lock and chain, even those that are specially treated or case hardened, can be readily broken with such standard tools as bolt cutters, hacksaws, or hammers.

Thus, it is the primary purpose of the present invention to provide a motorcycle locking device that is not only more effective than the conventional lock and chain, but is also more convenient and safer to transport. The device essentially comprises an elongated solid steel bar having a pair of slots formed therein. The device is used to lock the motorcycle by inserting the bar through the spokes in the rear wheel and securing the bar with a pair of padlocks to mounting brackets which are permanently secured to a rear frame member of the motorcycle, typically the swing-arm. As will subsequently be described in greater detail, the bar is preferably secured in the locking position by inserting the shackles of the padlocks through the slots in the bar and securing the same to the mounting brackets. In this manner, the most vulnerable portion of the padlocks—the shackles—are protected by the bar.

To transport the locking bar of the present invention, an additional bracket arrangement is mounted to the front frame member of the motorcycle, typically the down-tubes, and the bar secued thereto in a horizontal position so as to provide a raised footrest for the rider, commonly called "highway pegs". With the bar secured in this manner, a convenient and safe means of transporting the bar is provided.

Additional objects and advantages of the present invention will become apparent from a reading of the detailed description of the preferred embodiment which makes reference to the following set of drawings in which:

DETAILED DESCRIPTION OF THE PREFERRED EMBODIMENT

Figure 1:
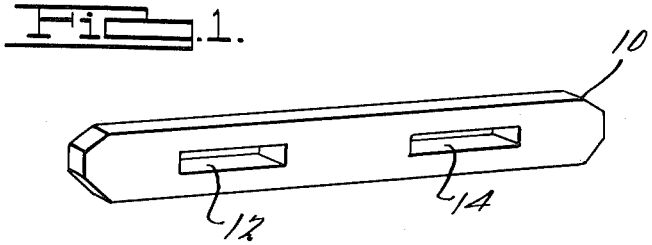
FIG. 1 is a perspective view of a lock bar according to the present invention.

Referring to FIG. 1, a lock bar 10 for a motorcycle according to the present invention is shown. The lock bar 10 comprises an elongated metal bar preferably manufactured of chrome-plated hardened steel or hardened stainless steel. The bar 10 has formed therein a pair of spaced slots 12 and 14 which are of sufficient length to accommodate the shackle of a padlock in a manner to be subsequently described. The overall design of the bar 10, and in particular the thickness of the bar, is intended to resist cutting. In addition, it will be noted that the bar 10 is of sufficient length so that when the bar is positioned transversely to the bike, the end of the bar 10 will protrude a substantial distance on either side of the motorcycle. The reason for this will also be subsequently explained.

Figure 2:
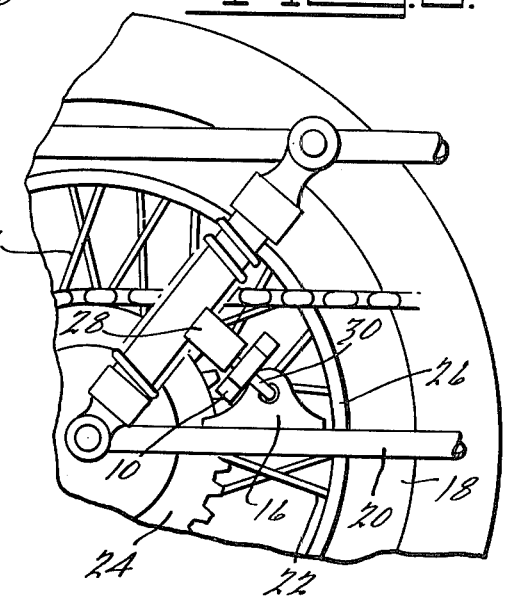
FIG. 2 is a partial view of the rear wheel assembly of a motorcycle illustrating the lock bar of the present invention in the locking position.
Figure 4:
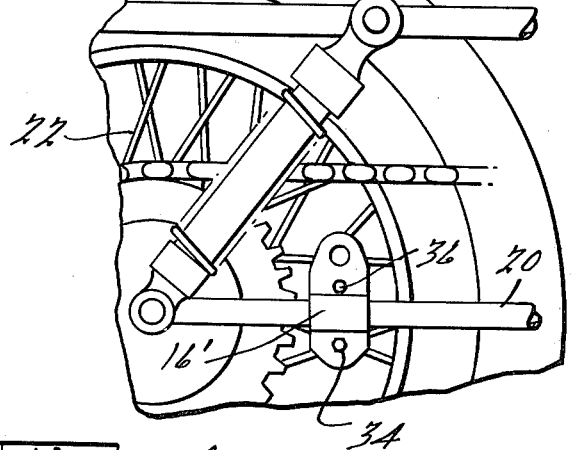
FIG. 4 is a view of the rear wheel assembly of a motorcycle illustrating a modified type of rear mounting bracket.

Looking to FIG. 2, a partial view of the rear wheel assembly of a motorcycle is shown. Welded to the swing-arm 20 of the motorcycle on both sides of the rear wheel 18 is a pair of rear mounting brackets 16. Alternatively, a mounting bracket 16' shown in FIG. 4 can be used which is adapted to be clamped to the swing-arm 20 by a pair of bolts 34 and 36. The ends of the bolts 34 and 36 are preferably brazed or spot welded to prevent removal of the mounting brackets 16'. The mounting brackets 16 (16') are also preferably manufactured from the same hardened steel as the bar 10 to resist cutting. Importantly, it will be noted that the rear mounting brackets 16 (16') in no way degrade the integrity of the frame of the motorcycle or otherwise affect the operation of the bike.

Figure 3:
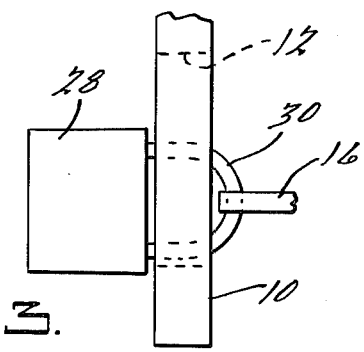
FIG. 3 is a detailed view of the preferred manner in which the padlock is secured to the rear mounting brackets.

Returning to FIG. 2, the lock bar 10 is secured in the locking position by inserting the bar 10 through the spokes 22 of the rear wheel 18 between the sprocket 24 and the rim 26. The slots 12 and 14 in the bar 10 are aligned with the rear mounting brackets 16 so that the shackles 30 of the padlocks 28 can be inserted through the slots 12 and 14 and secured to the mounting brackets 16, as best shown in FIG. 3. The significance of securing the bar 10 in this manner is that the most vulnerable portion of the padlock 28—the shackle 30—is protected by the bar 10. Thus, an insufficient portion of the shackle 30 is exposed which would allow the shackle to be cut by a set of bolt cutters.

Accordingly, it can be seen that when the lock bar 10 of the present invention is secured in the locking position, the motorcycle cannot possibly be rolled or driven away without removing or in some way breaking the bar 10. Because the bar 10 is several times stronger than the frame of the motorcycle, it is highly unlikely that a potential thief would risk damaging the motorcycle in an attempt to remove the bar 10, since damaging the motorcycle would be counter-productive to the purpose of the theft. In addition, in that the bar 10 is designed to accommodate two padlocks 28, the owner can use a pair of padlocks requiring different keys so that the chances of a thief having a matching set of keys is greatly reduced.

Figure 6:
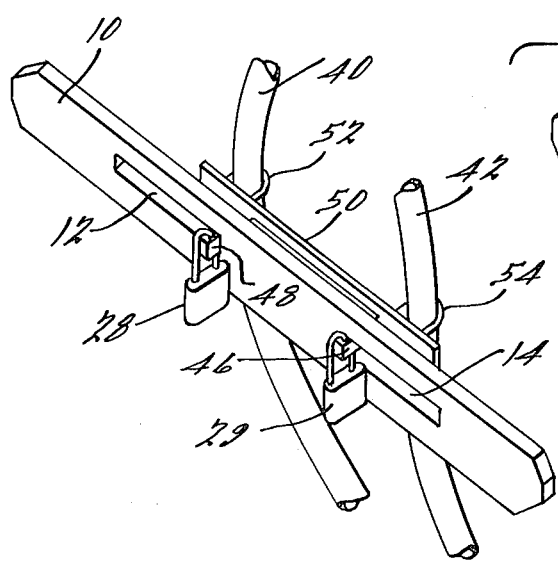
FIG. 6 illustrates the lock bar fastened to the front frame of the motorcycle in the transport position.
Figure 5:
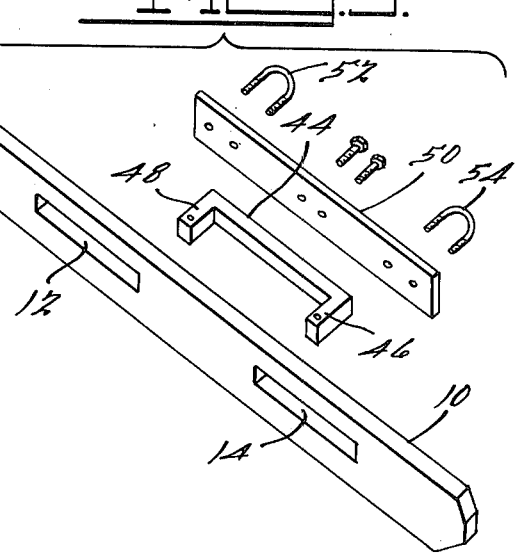
FIG. 5 is an exploded view illustrating the manner in which the lock bar of the present invention is secured in its transport position.

To carry or transport the bar 10, a front mounting bracket 44 is provided that is secured to the front frame member or down-tubes 40 and 42 of the motorcycle, as illustrated in FIG. 6. With particular reference to the exploded view of FIG. 5, a pair of U-bolts 52 and 54 are used to secure a mounting plate 50 to the down-tubes 40 and 42. The U-shaped mounting bracket 44 is then fastened to the mounting plate 50 so that the legs 46 and 48 of the bracket 44 protrude outwardly from the mounting plate 50 as shown. The bar 10 is secured in the transport position by placing the bar 10 over the bracket 44 so that the legs 46 and 48 of the bracket 44 extend through the slots 12 and 14 in the bar 10, and fastening the two padlocks 28 to the legs 46 and 58 of the mounting bracket 44 as illustrated in FIG. 6.

As noted previously, the length of the bar 10 is designed to be long enough so that when mounted in the transport position, the ends of the bar 10 protrude sufficiently from the sides of the motorcycle so as to provide a raised footrest for the rider, commonly referred to as "highway pegs". Thus, unlike other locking devices which serve no useful function while being transported, the lock bar 10 of the present invention is designed to be functional not only as an effective locking device but also as a highly desirable accessory item when carried by the motorcycle. In addition, it will be appreciated that the transport position described constitutes both a safe and convenient means of carrying the bar 10.

While the above description constitutes the preferred embodiment of the invention, it will be appreciated that the invention is susceptible to modification, variation and change without departing from the proper scope or fair meaning of the accompanying claims.

What is claimed is:

1. In combination with a two-wheeled vehicle having at least one spoked wheel and a vehicle frame for supporting an operator seat, a first pair of frame members located forwardly and extending downwardly relative to the seat and a second pair of frame members extending generally parallel to one another along opposite sides of the spoked wheel, a first mounting bracket having a first portion affixed to said first pair of frame members and a second portion comprising a pair of spaced apart longitudinally locking sections arranged at generally right angles to said first portion, said locking sections having lock engaging portions on the terminal ends thereof, a second mounting backet comprising a pair of bracket elements secured one to each of said frame members of said second pair thereof, said bracket elements being spaced laterally from one another approximately the same distance as said locking sections of said first mounting bracket and having lock engaging portions thereon, a dual positionable elongated bar having a pair of slots formed therein and spaced apart approximately the same distance as the lateral spacing of said bracket elements and said locking sections, and a pair of releasable lock assemblies each having a locking member detachably engageable with said lock engaging portions of said locking sections of said first mounting bracket and said bracket elements of said second mounting bracket, whereby said bar may be placed in a first position adjacent first pair of frame members so as to have said locking sections of said first mounting bracket extend through said slots thereof and be retained in said first position by said locking members being engaged with said lock engaging portions of said locking sections, and alternatively, said bar may be placed at a second position adjacent said second pair of frame members and extending through the spokes of the adjacent vehicle wheel and be detachably secured in said second position by having said locking members of said lock assemblies extend through said slots and be detachably engageable with the respective of said lock engaging portions of said bracket elements, said bar in said first position extending laterally outwardly from said first pair of frame members and thereby serving as a foot rest for the vehicle operator, and said bar in said second position serving as a locking device to prevent relative rotation of said spoked wheel with respect to said second pair of frame members.

* * * * *